United States Patent
Shibanuma et al.

(10) Patent No.: US 7,262,227 B2
(45) Date of Patent: Aug. 28, 2007

(54) PROCESS FOR PRODUCING SYNTHETIC RESIN FOAM, BLOWING AGENT AND PREMIX

(75) Inventors: Takashi Shibanuma, Settsu (JP); Noriaki Shibata, Settsu (JP)

(73) Assignee: Daikin Industries, Ltd., Osaka-shi (JP)

( * ) Notice: Subject to any disclaimer, the term of this patent is extended or adjusted under 35 U.S.C. 154(b) by 0 days.

(21) Appl. No.: 10/511,442

(22) PCT Filed: Apr. 25, 2003

(86) PCT No.: PCT/JP03/05332

§ 371 (c)(1),
(2), (4) Date: Oct. 25, 2004

(87) PCT Pub. No.: WO03/091305

PCT Pub. Date: Nov. 6, 2003

(65) Prior Publication Data

US 2005/0131091 A1    Jun. 16, 2005

(30) Foreign Application Priority Data

Apr. 25, 2002 (JP) .............................. 2002-123910

(51) Int. Cl.
*C08J 9/14* (2006.01)

(52) U.S. Cl. ............ 521/130; 252/182.24; 252/182.27; 252/182.28; 510/407; 510/412; 516/12; 521/117; 521/128; 521/131; 521/170; 521/172; 521/173; 521/174

(58) Field of Classification Search ................ 521/128, 521/130, 131, 117, 170, 172, 173, 174; 252/182.24, 252/182.27, 182.28; 516/12; 510/407, 412
See application file for complete search history.

(56) References Cited

U.S. PATENT DOCUMENTS

| | | | |
|---|---|---|---|
| 6,080,799 A * | 6/2000 | Kruecke et al. | 521/131 |
| 6,380,275 B1 | 4/2002 | Kruecke et al. | 521/121 |
| 6,759,444 B2 * | 7/2004 | Brandoli et al. | 521/51 |
| 2003/0055118 A1 * | 3/2003 | Brandoli et al. | 521/51 |

FOREIGN PATENT DOCUMENTS

| | | | |
|---|---|---|---|
| DE | 19822944 | * | 11/1999 |
| EP | 1219674 | * | 7/2002 |
| JP | 2-29440 | | 1/1990 |
| JP | 2-235982 | | 9/1990 |
| JP | 11-343326 | | 12/1999 |
| JP | 2003-206330 | | 7/2003 |
| WO | WO 01/72880 A2 | * | 10/2001 |

OTHER PUBLICATIONS

International Search Report dated Aug. 19, 2003.

* cited by examiner

*Primary Examiner*—John M. Cooney, Jr.
(74) *Attorney, Agent, or Firm*—Kratz, Quintos & Hanson, LLP

(57) ABSTRACT

The present invention relates to a process for producing a synthetic resin foam which comprises reacting at least one polyol with at least one polyisocyanate compound in the presence of an organic blowing agent, wherein the organic blowing agent is a blowing agent for synthetic resin foams which is characterized by being a mixture comprising 1,1,1,3,3-pentafluorobutane (HFC-365mfc) and at least one halogen-containing compound and optionally containing at least one member selected from the group consisting of glycol compounds and amide compounds. Also provided are: a premix comprising the blowing agent and a polyol mixture; and a process for producing a synthetic resin foam from these.

10 Claims, No Drawings

PROCESS FOR PRODUCING SYNTHETIC RESIN FOAM, BLOWING AGENT AND PREMIX

TECHNICAL FIELD

The present invention relates to a process for producing a synthetic resin foam, and to an organic blowing agent and a premix for producing such a synthetic resin foam.

BACKGROUND OF THE INVENTION

Producing synthetic resin foams by reacting polyols with polyisocyanate compounds in the presence of catalysts and blowing agents has been widely practiced. Examples of synthetic resin foams thus obtained are polyurethane, polyisocyanurate, etc.

Trichlorofluoromethane (CFC-11) has been mainly used as an organic blowing agent in the production of synthetic resin foams such as the aforementioned polyurethane foams.

In recent years, it has been pointed out that some types of chlorofluorocarbons, once released in the atmosphere, deplete the ozone layer of the stratosphere, and as a result, the ecosystem including humans may be severely adversely affected. Therefore, the use of chlorofluorocarbons posing a high risk of ozone layer depletion is restricted under international agreements, including the use of CFC-11. Accordingly, the development of novel blowing agents that are free from or have a small risk of ozone layer depletion is required.

As a chlorofluorocarbon that has a low impact on the ozone layer, 1,1-dichloro-1-fluoroethane (HCFC-141b) is substituted for CFC-11.

However, this substance incorporates chlorine atoms in its molecular structure, and thus still poses some risk of depleting the ozone layer.

Japanese Unexamined Patent Publication Nos. 29440/1990 and 235982/1990 disclose processes for producing foams using fluorinated hydrocarbons that do not contain chlorine and have no risk of ozone layer depletion. Moreover, Japanese Unexamined Patent Publication No. 235982/1990 discloses the use of 1,1,1,3,3-pentafluorobutane (HFC-365mfc) as a blowing agent for plastic foam production. U.S. Pat. No. 6,380,275 discloses a blowing agent containing HFC365 and a low-boiling HFC.

HFC-365mfc is a hydrogen-containing fluorinated hydrocarbon having a boiling point of 40° C.; therefore, it is considered to have no risk of ozone layer depletion. Moreover, since HFC-365mfc has a boiling point comparable to that of HCFC-141b, HFC-356mfc is drawing attention as a leading candidate to substitute for HCFC-141b as a blowing agent. Moreover, it has a thermal conductivity of 15.5 mW/mK (transient hot-wire method, 50° C., 1 atmospheric pressure), having the qualities necessary for a blowing agent.

HFC-365mfc, although considered to have no flash point under the Japanese Fire Service Law, does have a flammability range (mixing ratio with air: 3.6 to 13.3 vol %). Therefore, it may turn flammable under some circumstances. Since the important point of HFC-containing blowing agents is their nonflammability, the possibility of ignition is a significant barrier to the use of HFC-365mfc.

Thus, to effectively use HFC-365mfc as a substitute for HCFC-141b, the development of techniques to control its flammability to render HFC-365mfc substantially nonflammable is necessary.

U.S. Pat. No. 6,380,275 discloses blowing agents containing HFC365 and low-boiling HFCs. These low-boiling blowing agents contain flammable substances (for example, HFC152a, HFC32, dimethyl ether, propane, etc.), and the purpose of using low-boiling HFCs is to enhance foaming and the properties of foamed articles, not aiming to render HFC365mfc itself nonflammable.

The present invention was accomplished in view of the prior art problems. One of the primary objects of the invention is to provide a blowing agent that, when mixed with a polyol to form a premix, renders the premix substantially nonflammable despite blend of HFC-365mfc.

Another primary object of the invention is to provide a process for producing a synthetic resin foam having excellent thermal insulation properties and outstanding mechanical strength.

DISCLOSURE OF THE INVENTION

The inventors conducted extensive research and found that the aforementioned objectives can be achieved by using a blowing agent having a specific composition, thereby accomplishing the present invention.

HFC-365mfc, despite having no flash point, nonetheless can ignite. This phenomenon occurs because the concentration of HFC-365mfc in the air exceeds the upper limit of the flammability range when the flash point of HFC-365mfc is measured. The concentration of HFC-365mfc in the air is estimated to be about 50% based on the vapor pressure of HCF-365mfc at 20° C., which is considered to exceed the upper limit of the flammability range (about 13%).

During synthetic resin foam production, HFC-365mfc is evaporated into the air from a mixture of HFC-365mfc and a polyol mixture (i.e., premix; polyol mixtures contain polyols, catalysts, foam stabilizers, flame retardants, stabilizers (decomposition inhibitors), etc. A polyol mixture is called a polyol system solution or, simply, a system solution. A mixture of a system solution and a blowing agent is called a premix.). The concentration of evaporated (vaporized) HCF-365mfc is presumed to exceed the upper limit of the flammability range. However, when evaporated HFC-365mfc is diluted with air, its concentration may come within the flammability range. There are cases in which the concentration of HFC-365mfc shifted within the flammability range, and the HFC-365mfc actually ignited. Such ignition can be avoided (achieving nonflammability) by controlling, without air dilution, the concentration of evaporated HFC-365mfc to a level lower than the flammability range.

The inventors found that, using a blowing agent containing HFC-365mfc and a halogen-containing compound, a premix containing the blowing agent is rendered barely flammable by controlling the partial pressure of HFC-365mfc evaporated from the premix to a level just below the lower limit of the flammability range or lower.

In particular, the present invention relates to processes for producing synthetic resin foams and to blowing agents as described below:

Item 1. A process for producing a synthetic resin foam comprising the step of reacting at least one polyol with at least one polyisocyanate compound in the presence of an organic blowing agent and a catalyst, wherein the blowing agent is a mixture comprising 1,1,1,3,3-pentafluorobutane and at least one halogen-containing compound.

Item 2. A process according to Item 1, wherein the organic blowing agent further comprises at least one member selected from the group consisting of glycol compounds and amide compounds.

Item 3. A process according to Item 1, wherein the organic blowing agent further comprises at least one glycol compound.

Item 4. A process according to Item 1 or 2, wherein the process comprises the step of mixing the organic blowing agent with the at least one polyol, a premix obtained according to the step being substantially nonflammable.

Item 5. A process according to Item 1 or 2, wherein the halogen-containing compound has a boiling point lower than the boiling point of HFC-365mfc (40° C.).

Item 6. A process according to Item 1 or 2, wherein the halogen-containing compound is nonflammable and has a boiling point of about 10 to about 60° C. and a thermal conductivity when it is in the gaseous state of about 8 to about 20 mW/mK at about 1 atmospheric pressure.

Item 7. A process according to Item 2, wherein the halogen-containing compound is nonflammable and has a boiling point of about −90 to about 10° C. and a thermal conductivity when it is in the gaseous state of about 8 to about 30 mW/mK at about 1 atmospheric pressure.

Item 8. A process according to Item 1 or 2, wherein the halogen-containing compound is at least one member selected from the group consisting of saturated or unsaturated hydrofluoroethers (HFEs), hydrofluorocarbons (HFCs), perfluorocarbons (PFCs) and fluoroiodocarbons (FICs).

Item 9. A process according to Item 1 or 2, wherein the halogen-containing compound is at least one member selected from the group consisting of 1,2,2-trifluoroethylene trifluoromethyl ether ($CF_2=CFOCF_3$), 1,2,2-trifluoroethylene 1,1,2,2,3,3,3-heptafluoropropyl ether ($CF_2=CFOCF_2CF_2CF_3$), perfluoropropyl epoxide ($CF_3CF(O)CF_2$), perfluoro-1-butene ($CF_2=CFCF_2CF_3$), perfluorohexenes ($C_6F_{12}$), perfluorononenes ($C_9F_{18}$), perfluorohexane ($C_6F_{14}$), perfluorocyclobutane (c-$C_4F_8$), iodotrifluoromethyl ($CF_3I$), 1,1,1,2,3,3-hexafluoropropane ($CF_3CFHCF_2H$), 1,1,1,3,3,3-hexafluoropropane ($CF_3CH_2CF_3$), 1,1,1,2,3,3,3-heptafluoropropane ($CF_3CFHCF_3$), pentafluoroethane ($CF_3CF_2H$), tetrafluoroethanes ($CHF_2CHF_2$, $CF_3CFH_2$), trifluoromethane ($CF_3H$), 1,1,2,2,3,3,4,4-octafluorobutane ($CF_2HCF_2CF_2CF_2H$), 1,1,1,2,2,3,4,5,5,5-decafluoropentane ($CF_3CF_2CFHCFHCF_3$), 2-trifluoromethyl-1,1,1,2,3,4,5,5,5-nonafluoropentane ($C_6F_{12}H_2$), 3,3,4,4,5,5,6,6,6-nonafluoro-1-hexene ($F(CF_2)_4CH=CH_2$), 2,3,3,4,4,5,5-heptafluoro-1-pentene ($CH_2CFCF_2CF_2CF_2H$), trifluoroethylene ($CF_2CFH$), 1,1,2,2-tetrafluoroethyl difluoromethyl ether ($CF_2HCF_2OCHF_2$), 1,1,2,2-tetrafluoroethyl methyl ether ($CF_2HCF_2OCH_3$), 2,2,2-trifluoroethyl 1,1,2,2-tetrafluoroethyl ether ($CF_3CH_2OCF_2CF_2H$), 1,1,2,3,3,3-pentafluoropropyl methyl ether ($CF_3CFHCF_2OCH_3$), nonafluorobutyl methyl ether ($C_4F_9OCH_3$), 1-trifluoromethyl-1,2,2,2-tetrafluoroethyl methyl ether (($CF_3)_2CFOCH_3$), perfluoropropyl methyl ether ($CF_3CF_2CF_2OCH_3$), 2,2,3,3,3-pentafluoropropyl difluoromethyl ether ($CF_3CF_2CH_2OCHF_2$), 1,2,3,3,4,4-hexafluorocyclobutane (c-$C_4F_6H_2$), 2,3-dichlorooctafluorobutane ($CF_3CFClCFClCF_3$, boiling point: 63° C.), 1-chloro-1,1,2,2,3,3,4,4-octafluorobutane ($CF_2ClCF_2CF_2CF_2H$, boiling point: 50° C.), 1,2-dichlorohexafluorocyclobutane (—$CFClCFClCF_2CF_2$—, boiling point: 60° C.), and 1,1,1,3,3,3-hexafluoropropan-2-ol ($CF_3CH(OH)CF_3$, boiling point: 59° C.).

Item 10. A process according to Item 1 or 2, wherein the halogen-containing compound is 1,1,1,2,3,3,3-heptafluoropropane (HFC227ea: $CF_3CFHCF_3$).

Item 11. A process according to Item 1 or 2, wherein the proportion of halogen-containing compound is about 1 to about 49 mol per 100 mol of HFC-365mfc and halogen-containing compound in total.

Item 12. A process according to Item 1 or 2, wherein the catalyst is a tertiary amine, an organometallic compound, or a mixture thereof.

Item 13. An organic blowing agent for producing a synthetic resin foam, the organic blowing agent comprising 1,1,1,3,3-pentafluorobutane and at least one halogen-containing compound.

Item 14. A blowing agent according to Item 13 further comprising at least one member selected from the group consisting of glycol compounds and amide compounds.

Item 15. A blowing agent according to Item 13 further comprising at least one glycol compound.

Item 16. A blowing agent according to Item 13, wherein the halogen-containing compound is 1,1,1,2,3,3,3-heptafluoropropane (HFC227ea: $CF_3CFHCF_3$).

Item 17. A premix for producing a synthetic resin foam, the premix comprising 1,1,1,3,3-pentafluorobutane, at least one halogen-containing compound and at least one polyol.

Item 18. A premix according to Item 17 further comprising at least one member selected from the group consisting of glycol compounds and amide compounds.

Item 19. A premix according to Item 17 further comprising at least one glycol compound.

Item 20. A premix according to Item 17, wherein the halogen-containing compound is 1,1,1,2,3,3,3-heptafluoropropane (HFC227ea: $CF_3CFHCF_3$).

Item 21. A premix according to Item 17 or 18 that is nonflammable.

The present invention relates to a process for producing a synthetic resin foam comprising the step of reacting a polyol with a polyisocyanate compound in the presence of an organic blowing agent, wherein a mixture comprising 1,1,1,3,3-pentafluorobutane (HFC-365mfc) and a halogen-containing compound and optionally a glycol compound and/or amide compound is used as the organic blowing agent.

The present invention further relates to an organic blowing agent for producing a synthetic resin foam, the organic blowing agent comprising 1,1,1,3,3-pentafluorobutane (HFC-365mfc) and a halogen-containing compound and optionally a glycol compound and/or amide compound.

Furthermore, the present invention relates to a premix for producing a synthetic resin foam, the premix comprising a polyol and an organic blowing agent (1,1,1,3,3-pentafluorobutane (HFC-365mfc), a halogen-containing compound, and optionally a glycol compound and/or an amide compound).

In a preferred embodiment of the invention, a mixture comprising 1,1,1,3,3-pentafluorobutane (HFC-365mfc), a halogen-containing compound, and a glycol compound is used as the organic blowing agent.

Examples of synthetic resin foams obtained according to the process of the invention are polyurethane foams, polyisocyanurate foams, etc.

Examples of halogen-containing compounds usable herein include those that have at least one halogen atom such as fluorine, chlorine, bromine, iodine, etc. One or more members of the halogen atoms may be contained.

Although such halogen-containing compounds preferably have a boiling point lower than that of HFC-365mfc (40°

C.), those that have a boiling point of 40° C. or higher are acceptable. Among halogen-containing compounds having a boiling point of 40° C. or higher, those that can form an azeotrope or an azeotrope-like composition with HFC-365mfc are preferable. It is however preferable to use such halogen-containing compounds in combination with at least one halogen-containing compound having a boiling point lower than 40° C. Therefore, a blowing agent may contain 3 or more components, i.e., at least HFC-365mfc, one or more halogen-containing compounds having a boiling point of 40° C. or higher, and one or more halogen-containing compounds having a boiling point less than 40° C.

It is preferable that the halogen-containing compounds usable herein have substantially no potential for ozone layer depletion. Examples of such halogen-containing compounds having substantially no ozone layer depletion potential include saturated or unsaturated hydrofluoroethers (HFEs), hydrofluorocarbons (HFCs), perfluorocarbons (PFCs), fluoroiodocarbon (FICs), etc.

Among halogen-containing compounds, chlorine-containing compounds have a potential for ozone layer depletion. However, those that have relatively high boiling points are not readily vaporized, and thus the potential for depleting the ozone layer is reduced despite containing chlorine. Those chlorofluorocarbons (CFCs) that are actually regulated to avoid ozone layer depletion are paraffin compounds having no more than 3 carbon atoms. Therefore, halogen-containing compounds usable herein include chlorofluoroalkanes having 4 or more carbon atoms (preferably 4 carbon atoms).

Specific examples of halogen-containing compounds are unsaturated hydrofluoroethers such as 1,2,2-trifluoroethylene trifluoromethyl ether ($CF_2=CFOCF_3$) and 1,2,2-trifluoroethylene 1,1,2,2,3,3,3-heptafluoropropyl ether ($CF_2=CFOCF_2CF_2CF_3$);

perfluoroalkylepoxides such as perfluoropropyl epoxide ($CF_3CF(O)CF_2$);

perfluoroalkenes such as perfluoro-1-butene ($CF_2=CFCF_2CF_3$), perfluorohexenes ($C_6F_{12}$) and perfluorononenes ($C_9F_{18}$);

perfluoroalkanes (perfluorocarbons: PFCs) such as perfluorohexane ($C_6F_{14}$);

perfluorocycloalkanes such as perfluorocyclobutane (c-$C_4F_8$);

fluoroiodoalkanes (fluoroiodocarbons: FICs) such as iodotrifluoromethane ($CF_3I$);

hydrofluoroalkanes (hydrofluorocarbons: HFCs) such as 1,1,1,2,3,3,3-heptafluoropropane ($CF_3CFHCF_3$), 1,1,1,3,3,3-hexafluoropropane ($CF_3CH_2CF_3$), 1,1,1,2,3,3-hexafluoropropane ($CF_3CFHCF_2H$), pentafluoroethane ($CF_3CF_2H$), tetrafluoroethanes ($CHF2CHF_2$, $CF_3CFH_2$), trifluoromethane ($CF_3H$), 1,1,2,2,3,3,4,4-octafluorobutane ($CF_2HCF_2CF_2CF_2H$), 1,1,1,2,2,3,4,5,5,5-decafluoropentane ($CF_3CF_2CFHCFHCF_3$) and 2-trifluoromethyl-1,1,1,2,3,4,5,5,5-nonafluoropentane ($C_6F_{12}H_2$);

hydrofluoroalkenes such as 3,3,4,4,5,5,6,6,6-nonafluoro-1-hexene ($F(CF_2)_4CH=CH_2$), 2,3,3,4,4,5,5-heptafluoro-1-pentene ($CH_2CFCF_2CF_2CF_2H$) and trifluoroethylene ($CF_2CFH$);

saturated hydrofluoroethers (HFES) such as 1,1,2,2-tetrafluoroethyl difluoromethyl ether ($CF_2HCF_2OCHF_2$), 1,1,2,2-tetrafluoroethyl methyl ether ($CF_2HCF_2OCH_3$), 2,2,2-trifluoroethyl 1,1,2,2-tetrafluoroethyl ether ($CF_3CH_2OCF_2CF_2H$), 1,1,2,3,3,3-pentafluoropropyl methyl ether ($CF_3CFHCF_2OCH_3$), nonafluorobutyl methyl ether ($C_4F_9OCH_3$), 1-trifluoromethyl-1,2,2,2-tetrafluoroethyl methyl ether (($CF_3)_2CFOCH_3$), perfluoropropyl methyl ether ($CF_3CF_2CF_2OCH_3$) and 2,2,3,3,3-pentafluoropropyl difluoromethyl ether ($CF_3CF_2CH_2OCHF_2$);

hydrofluorocycloalkanes such as 1,2,3,3,4,4-hexafluorocyclobutane (c-$C_4F_6H_2$);

chlorofluoroalkanes (chlorofluorocarbons: CFCs) such as 2,3-dichlorooctafluorobutane ($CF_3CFClCFClCF_3$, boiling point: 63° C.);

hydrochlorofluoroalkanes (hydrochlorofluorocarbons: HCFCs), such as 1-chloro-1,1,2,2,3,3,4,4-octafluorobutane ($CF_2ClCF_2CF_2CF_2H$, boiling point: 50° C.);

chlorofluorocycloalkanes such as 1,2-dichlorohexafluorocyclobutane (—$CFClCFClCF_2CF_2$—, boiling point: 60° C.); and hydrofluoroalcohols such as 1,1,1,3,3,3-hexafluoropropan-2-ol ($CF_3CH(OH)CF_3$, boiling point: 59° C.).

Halogen-containing compounds usable herein are preferably nonflammable. Those that can be used by themselves as extinguishing agents are preferable as halogen-containing compounds of the invention. Examples of such halogen-containing compounds are $CF_3I$, $CF_3CF_2H$, $CF_3H$, $CF_3CFHCF_3$, etc.

Halogen-containing compounds usable herein preferably have properties by themselves suitable for blowing agents. In particular, preferable halogen-containing compounds are per se nonflammable and have a low thermal conductivity and a boiling point of about 10 to about 60° C. The thermal conductivity of the halogen-containing compounds, when they are in the gaseous state, is preferably about 8 to about 20 mW/mK at about 1 atmospheric pressure. Such halogen-containing compounds can function by themselves as blowing agents when used. Among the halogen-containing compounds described above, examples of such halogen-containing compounds include those that have a boiling point of about 10 to about 60° C. and the like. To improve the compatibility of halogen-containing compounds in system solutions as well as in solutions (isocyanate solutions) to be reacted by mixing with system solutions, halogen-containing compounds are preferably used in conjunction with glycol compounds and/or amide compounds (glycol compounds, in particular). Improved compatibility enables urethane linkage with an enhanced conversion rate, enabling uniform foams to be produced. Therefore, improvement in the adhesion, thermal insulation and mechanical strength of foams is expected.

Also preferable herein are low-boiling halogen-containing compounds that are nonflammable and have a relatively low thermal conductivity and a boiling point of about −90 to about 10° C. The preferable thermal conductivity of such halogen-containing compounds, when they are in the gaseous state, is about 8 to about 30 mW/mK at about 1 atmospheric pressure. The use of such halogen-containing compounds can lower the partial pressure of the evaporated HFC365mfc (in particular, to a level below the lower limit of the flammability range). Moreover, since they are easily evaporated, such low-boiling compounds are preferably used in combination with glycol compounds and/or amide compounds (glycol compounds, in particular). The addition of glycol compounds and/or amide compounds enhances the compatibility of HFC-365mfc and halogen-containing compounds with system solutions. Due to the enhanced compatibility, the evaporation of a blowing agent composed of HFC-365mfc and halogen-containing compounds, particularly low-boiling halogen-containing compounds, from the premix can be discouraged. The greater the extent the halogen compounds can be retained in the premix, the greater the partial pressure of the halogen-containing compounds that can be maintained, thereby readily maintaining the effect of inhibiting HFC-365mfc ignition. Moreover, improved compatibility enables urethane linkage with an enhanced conversion rate, allowing uniform foams to be produced. Therefore, improvement in the adhesion, thermal insulation and mechanical strength of foams is expected.

When a halogen-containing compound can itself function as a blowing agent, the amount of blowing agent mixture of the present invention may be about the same as that of a blowing agent consisting of HFC-365mfc alone. In other words, the proportion of HFC-365mfc in the blowing agent can be reduced without problem, thereby significantly reducing the partial pressure of HFC-365mfc in the vapor pressure of the premix containing a polyol and the blowing agent of the invention. Moreover, when a foam is actually prepared, the halogen-containing compound by itself can function as a blowing agent, thereby avoiding concerns about the halogen-containing compound remaining in the foam as a condensate.

With respect to the organic blowing agent usable herein, when it is blended with a polyol mixture (to prepare a premix), the premix is preferably substantially nonflammable. The term "substantially nonflammable" means that the partial pressure of HFC-365mfc is a level just below the lower limit of the flammability range or lower. In an concrete sense, it refers to that "when the flame of a match is brought closer to the surface of the premix from a vertical distance of 50 cm from the surface, the flame does not spread in a horizontal direction", or refers to "the flash point measurement corresponding to hazardous material, class 4, petroleum 3 or higher".

The ratio of HFC-365fmc to halogen-containing compound can be suitably selected according to the intended use, type of halogen-containing compound, etc. For example, it is usually arranged such that the partial pressure of HFC-365mfc at about 10 to about 30° C. is just below the lower limit of the flammability range or lower relative to the entire vapor pressure of a premix containing HFC-365mfc, a halogen-containing compound and a polyol.

Alternatively, it is preferable to mix HFC-365mfc and halogen-containing compound(s) such that the ratio of the vapor pressure of HFC-365mfc to the air is about 50% or less, preferably about 20% or less, and more preferably about 10% or less relative to that of HFC-365mfc when it is used alone, by varying the molar ratio of HFC-365mfc to halogen-containing compound in the premix.

The ratio of halogen-containing compound in the blowing agent mixture is about 1 to about 49 mol, preferably about 5 to about 40 mol and particularly preferably about 5 to about 30 mol per 100 mol of HCF-365mfc and halogen-containing compound in total.

The amount of glycol compound and/or amide compound is 0.5 to 40 parts by weight, preferably 1 to 30 parts by weight and particularly preferably 3 to 25 parts by weight per 100 parts by weight of HFC-365mfc and halogen-containing compound in total,.

Examples of glycol compounds usable herein are alkylene glycols such as ethylene glycol compounds, propylene glycol compounds and butylene glycol compounds. Alkylene glycols usually have an alkylene group having about 2 to about 4 carbon atoms and preferably have an alkylene group having about 2 or about 3 carbon atoms. Further examples are glycol phenyl ethers such as ethylene glycol monophenyl ether, ethylene glycol monomethylphenyl ether, diethylene glycol monomethylphenyl ether, tetraethylene glycol monophenyl ether and propylene glycol phenyl ether.

Examples of ethylene glycol compounds include those of the following Formulae (I), (II) and (III):

$$C_aH_{2a+1}(OCH_2CH_2O)_bC_cH_{2c+1} \qquad (I)$$

wherein a represents 0, 1, 2, 3 or 4; b represents 1, 2 or 3; and c represents 0, 1, 2, 3 or 4;

$$C_dH_{2d+1}CO(OCH_2CH_2O)_eCOC_fH_{2f+1} \qquad (II)$$

wherein d represents 0, 1, 2, 3 or 4; e represents 1, 2 or 3; and f represents 0, 1, 2, 3 or 4; and $$C_iH_{2i+1}CO(OCH_2CH_2O)_jC_kH_{2k+1} \qquad (III)$$

wherein i represents 0, 1, 2, 3 or 4; j represents 1, 2 or 3; and k represents 0, 1, 2, 3 or 4.

Specific examples of ethylene glycol compounds of Formula (I) are ethylene glycol, ethylene glycol methyl ether, ethylene glycol dimethyl ether, ethylene glycol ethyl ether, ethylene glycol diethyl ether, ethylene glycol propyl ether, ethylene glycol dipropyl ether, ethylene glycol butyl ether, ethylene glycol dibutyl ether, diethylene glycol methyl ether, diethylene glycol dimethyl ether, diethylene glycol ethyl ether, diethylene glycol diethyl ether, diethylene glycol propyl ether, diethylene glycol dipropyl ether, diethylene glycol butyl ether, diethylene glycol dibutyl ether, triethylene glycol methyl ether, triethylene glycol dimethyl ether, triethylene glycol ethyl ether, triethylene glycol diethyl ether, triethylene glycol propyl ether, triethylene glycol dipropyl ether, triethylene glycol butyl ether, triethylene glycol dibutyl ether, etc. Further examples are ethylene glycol hexyl ether, diethylene glycol hexyl ether and the like, Specific examples of ethylene glycol compounds of Formula (II) are ethylene glycol monoformate, ethylene glycol diformate, diethylene glycol monoformate, diethylene glycol diformate, triethylene glycol monoformate, triethylene glycol diformate, ethylene glycol monoacetate, ethylene glycol diacetate, diethylene glycol monoacetate, diethylene glycol diacetate, triethylene glycol monoacetate, triethylene glycol diacetate, ethylene glycol monopropionate, ethylene glycol dipropionate, diethylene glycol monopropionate, diethylene glycol dipropionate, triethylene glycol monopropionate, triethylene glycol dipropionate, etc.

Specific examples of ethylene glycol compounds of Formula (III) are ethylene glycol methyl ether formate, ethylene glycol ethyl ether formate, ethylene glycol propyl ether formate, ethylene glycol methyl ether acetate, ethylene glycol ethyl ether acetate, ethylene glycol propyl ether acetate, ethylene glycol methyl ether propionate, ethylene glycol ethyl ether propionate, ethylene glycol propyl ether propionate, diethylene glycol methyl ether acetate, diethylene glycol methyl ether formate, diethylene glycol ethyl ether formate, diethylene glycol propyl ether formate, diethylene glycol ethyl ether acetate, diethylene glycol propyl ether acetate, diethylene glycol methyl ether propionate, diethylene glycol ethyl ether propionate, diethylene glycol propyl ether propionate, triethylene glycol methyl ether formate, triethylene glycol ethyl ether formate, triethylene glycol propyl ether formate, triethylene glycol methyl ether acetate, triethylene glycol ethyl ether acetate, triethylene glycol propyl ether acetate, triethylene glycol methyl ether propionate, triethylene glycol ethyl ether propionate, triethylene glycol propyl ether propionate, etc. Further examples are ethylene glycol butyl ether acetate, diethylene glycol butyl ether acetate and the like.

Examples of ethylene glycol compounds include those represented by Formula (I) wherein b is 4, those represented by Formula (II) wherein e is 4, and those represented by Formula (III) wherein j is 4. Specific examples are tetraethylene glycol, tetraethylene glycol dimethyl ether and the like.

Preferable ethylene glycol compounds include diether compounds of Formula (I) where a and c are 1 or more, diester compounds of Formula (II) where d and f are 1 or more, and ether ester compounds of Formula (III) where i and k are 1 or more, etc. More preferable are ethylene glycol diacetate, ethylene glycol diethyl ether, ethylene glycol methyl ether acetate, diethylene glycol ethyl ether acetate, diethylene glycol dimethyl ether and the like. Ethylene glycol monoethyl ether can also be suitably used. Furthermore, preferable ethylene glycol compounds include ethylene glycol dimethyl ether, ethylene glycol mono-n-butyl ether acetate, ethylene glycol ethyl ether acetate, diethylene glycol butyl ether acetate, diethylene glycol diethyl ether, diethylene glycol dibutyl ether, diethylene glycol di-n-butyl ether, triethylene glycol dimethyl ether, tetraethylene glycol dimethyl ether, ethylene glycol monomethyl ether, ethylene glycol mono-n-butyl ether, ethylene glycol monoisopropyl ether, ethylene glycol mono-n-propyl ether, ethylene glycol n-hexyl ether, diethylene glycol monoethyl ether, diethylene glycol monomethyl ether, diethylene glycol monoisopropyl ether, diethylene glycol mono-n-propyl ether, diethylene glycol t-butyl ether, diethylene glycol n-hexyl ether, diethylene glycol mono-n-butyl ether, triethylene glycol monoethyl ether, triethylene glycol monomethyl ether, etc.

Moreover, the desired effect can be obtained from, for example, propylene glycol compounds such as tripropylene glycol monoethyl ether. Examples of propylene glycol compounds are propylene glycol, dipropylene glycol, tripropylene glycol, propylene glycol monomethyl ether, propylene glycol monobutyl ether, 3-methoxy-1-butanol, 3-methoxy-3-methylbutanol, dipropylene glycol monoethyl ether, dipropylene glycol monomethyl ether, dipropylene glycol monobutyl ether, tripropylene glycol monomethyl ether, tripropylene glycol monobutyl ether, 2-methoxy-1-propanol, tripropylene glycol dimethyl ether, propylene glycol monomethyl ether acetate, 3-methoxy-3-methylbutyl acetate, 3-methoxybutyl acetate and like compounds. Especially preferable are tripropylene glycol dimethyl ether, propylene glycol monomethyl ether acetate, 3-methoxy-3-methylbutyl acetate and 3-methoxybutyl acetate.

Further examples of glycol compounds include butyleneglycol diacetate and like butylene glycol compounds.

Amide Compounds

Examples of amide compounds usable herein include those of the following Formulae (A) and (B):

$$R^1CONR^2R^3 \quad (A)$$

wherein $R^1$ is a hydrogen atom, a lower alkyl group or a phenyl group; and $R^2$ and $R^3$ are the same or different, and independently represent a hydrogen atom or a lower alkyl group; with the proviso that $R^1$ and $R^2$ may form a heterocyclic ring in conjunction with the carbon atom of the carbonyl group to which $R^1$ is bound and the nitrogen atom to which $R^2$ is bound; and

$$R^4R^5NCONR^6R^7 \quad (B)$$

wherein $R^4$, $R^5$, $R^6$ and $R^7$ are the same or different, and represent a hydrogen atom or a lower alkyl group, with the proviso that $R^4$ and $R6$ may form a heterocyclic ring in conjunction with the nitrogen atom to which $R^6$ is bound, the nitrogen atom to which $R^4$ is bound and the carbon atom of the carbonyl group.

The number of carbon atoms contained in the lower alkyl groups represented by $R^1$, $R^2$ or $R^3$ is usually about 1 or about 2, and a methyl group is preferable.

$R^1$ is a hydrogen atom, a lower alkyl group or a phenyl group. A hydrogen atom or a methyl group is preferable.

$R^2$ is a hydrogen atom or a lower alkyl group. A lower alkyl group is preferable and a methyl group is particularly preferable among others.

$R^3$ is a hydrogen atom or a lower alkyl group. A lower alkyl group is preferable and a methyl group is particularly preferable among others.

Moreover, in Formula (A), $R^1$ and $R^2$ may form a heterocyclic ring in conjunction with the carbon atom of the carbonyl group to which $R^1$ is bound and the nitrogen atom to which $R^2$ is bound. In other words, a compound of Formula (A) may be a cyclic amide compound. An example of such a heterocyclic ring is a five-membered ring.

Examples of amide compounds represented by Formula (A) include N,N-dimethylformamide, N,N-dimethylacetamide, N,N-dimethylpropionamide, N-methylformamide, N-methylacetamide, N-methylpropionamide, N-methylbenzamide, etc. Examples of cyclic amide compounds represented by Formula (A) include N-methylpyrrolidone and the like.

The number of carbon atoms contained in a lower alkyl group represented by $R^4$, $R^5$, $R^6$ or $R^7$ is usually about 1 or about 2, and a methyl group is preferable.

$R^4$ and $R^6$ may form a heterocyclic ring in conjunction with the nitrogen atom to which $R^6$ is bound, the nitrogen atom with which $R^4$ is bound and the carbon atom of the carbonyl group. In other words, a compound of Formula (B) may be a cyclic compound. An example of such a heterocyclic ring is a five-membered ring.

Examples of amide compounds represented by Formula (B) include tetramethylurea and the like. Examples of cyclic compounds represented by Formula (B) are 1,3-dimethylimidazolidinone and the like.

Preferable glycol compounds and amide compounds are those that are highly compatible with HFC-365mfc, halogen-containing compounds and polyols. For example, preferable glycol compounds and/or amide compounds do not exhibit phase separation after shaking HFC-365mfc, one or more polyols and one or more glycol compounds and/or one or more amide compounds for about 10 minutes and leaving to stand at about 0 to about 25° C. for about 5 hours. In terms of compatibility with HFC-365mfc, halogen-containing compounds and polyols, the compounds specified above are preferably used. The higher the compatibility of a glycol compound and/or an amide compound with HFC-365mfc, a halogen-containing compound and a polyol, the less the loss (amount evaporated) of blowing agent, when a mixture (premix) containing the polyol and the blowing agent is placed in an open system. Moreover, by reducing the amount evaporated, the partial pressure of the halogen-containing compound is maintained at a higher level for a long period of time, giving sustained nonflammability.

Glycol compounds and amide compounds are preferably flame retardant. Although they themselves do not have to be absolutely nonflammable, it is sufficient that mixtures thereof with HFC-365fmc and halogen-containing compounds are flame retardant. It is preferable that the glycol compounds and amide compounds have a flame retardancy corresponding to or better than that of hazardous material, class 4, petroleum 3. However, the flame retardancy of glycol compounds and amide compounds is not limited insofar as premixes exhibit a flame retardancy approximately the same as or better than that of hazardous material, class 4, petroleum 3. The use of flame retardant glycol compounds and/or amide compounds can ensure blowing agents are flame retardant so that the flame retardancy required upon foaming at work sites can be attained. The flame retardancy of hazardous material, class 4, petroleum 3 corresponds to the flash point of about 70° C. or higher but less than 200° C. for liquids. Whether compounds are liquid or not is determined at 1 atmospheric pressure at 20° C. Therefore, the flame retardancy of hazardous material, class 4, petroleum 3 concerns flammable liquids having a flash point of about 70° C. or higher. For example, the flash point of diethylene glycol monoethyl ether acetate is 110° C. and the flash point of ethylene glycol diacetate is 96° C., and both compounds are liquid at a temperature of 20° C. Thus, they can be categorized as hazardous material, class 4, petroleum 3.

The ratio of glycol compound and/or amide compound to the mixture of HFC-365fmc and a halogen-containing compound can be suitably selected according to the application, the composition of the ingredients of the synthetic resin foam, etc. The amount of glycol compound and/or amide compound is 0.5 to 40 parts by weight preferably 1 to 30 parts by weight and more preferably 3 to 25 parts by weight per 100 parts by weight of HCF-365mfc and halogen-containing compound in total. Excessive glycol compounds and/or amide compounds adversely affect the dimensional stability, mechanical strength and other properties of foams.

In a particularly preferable embodiment of the present invention, the organic blowing agent contains HFC-365mfc, HFC227ea (halogen-containing compound) and a glycol compound. The proportions of these ingredients are HFC-365mfc (35 to 92 parts by weight), HFC227ea (5 to 35 parts by weight), and glycol compound (3 to 30 parts by weight).

The organic blowing agent of the present invention may be used along with other blowing agents. In particular, the blowing agent mixture can be used either alone or in combination with other blowing agents. Examples of such other blowing agents include inert gases such as air, nitrogen and carbon dioxide gas. The amount of other blowing agents to be used is not limited insofar as the effects of the present invention is not impaired. When other blowing agents are used, the proportion of the organic blowing agent of the present invention in the entire blowing agent is usually about 20 wt. % or more, preferably about 40 wt. % or more and particularly preferably about 60 to about 95 wt. %.

The organic blowing agent of the present invention may contain water. In particular, the blowing agent mixture can be used in combination with water. The proportion of water is about 60 mol or less per 100 mol of HFC-365mfc, halogen-containing compound and water in total. Water contained within this range ensures the production of foams of high thermal insulation.

Moreover, the blowing agent of the invention may contain known decomposition inhibitors as necessary. Examples of such decomposition inhibitors are nitro compounds such as nitrobenzene and nitromethane; aromatic hydrocarbons such as α-methylstyrene and p-isopropenyltoluene; aliphatic unsaturated hydrocarbons such as isoprene and 2,3-dimethylbutadiene; epoxy compounds such as 1,2-butylene oxide and epichlorohydrin; phenolic compounds such as p-t-butyl catechol and 2,6-di-t-butyl-p-cresol; chloroacetate compounds such as isopropyl chloroacetate; etc. The proportion of decomposition inhibitor can be suitably selected according to its type and other factors. It is usually about 0.05 to about 5 parts by weight based on 100 parts by weight of the organic blowing agent of the present invention. Decomposition inhibitors may be mixed with the organic blowing agent in advance of foaming or may be added separately when used for foaming.

The proportion of the organic blowing agent of the present invention to be used can be suitably selected depending on the type of halogen-containing compound and glycol compound and/or amide compound, etc. HFC-365mfc, the halogen-containing compound and the glycol compound and/or the amide compound together usually account for about 1 to about 70 parts by weight, preferably about 10 to about 60 parts by weight and more preferably about 15 to about 50 parts by weight per 100 parts by weight of polyol.

According to the production process of the invention, a polyol and a polyisocyanate compound are reacted in the presence of an organic blowing agent to produce a synthetic resin foam. Examples of a synthetic resin foam thus obtained are polyurethane foams, polyisocyanurate foams, etc.

Starting materials other than blowing agents such as polyols and polyisocyanate compounds are not limited. Examples thereof are as described below:

For polyisocyanate compounds, usable are aliphatic, alicyclic and aromatic organic isocyanates as described in, for example, Keiji Iwata, *Polyurethane Resin Handboook*, Nikkan Kogyo Shinbunsha, pp. 71-98. This publication is incorporated herein by reference. The most widely used polyisocyanates are, for example, 2,4-tolylenediisocyanate (2,4-TDI) and 2,6-tolylenediisocyanate (2,6-TDI). They are usually used as mixtures having a 2,4-TDI/2,6-TDI ratio of about 80/20 or about 65/35 by weight, and are preferably used herein. Also preferably usable herein is polyphenyl polymethylene polyisocyanate (crude MDI) obtained by phosgenating the condensation product of aniline and formaldehyde.

Polyols are in publications such as described in Keiji Iwata, *Polyurethane Resin Handbook*, Nikkan Kogyo Shinbunsha, pp. 99-117. This publication is incorporated herein by reference. Polyether polyols, polyester polyols and the like are preferably used.

Polyether polyols can be obtained by, for example, reacting alkylene oxides with initiators containing an active hydrogen atom(s). Usable examples of polyether polyols are those that have about 2 to about 8 functional groups and a hydroxyl value of about 300 to about 800 mg KOH/g obtained by reacting initiators such as ethylene glycol, trimethylolpropane, glycerol, triethanolamine, ethylenediamine, methylglucoside, tolylenediamine, sorbitol and sucrose with alkylene oxides such as ethylene oxide and propylene oxide.

Examples of polyester polyols include condensed polyester polyols prepared by polycondensation of adipic acid with glycols or triols; lactone-based polyesters prepared by ring-opening polymerization of caprolactam; polycarbonate diols; and the like. Preferably usable among these are those that have, for example, about 2 to about 4 functional groups and a hydroxyl value of about 250 to about 500 mg KOH/g.

The ratio of polyol to polyisocyanate compound can be suitably selected. However, it is usually preferably such that the amount of active hydrogen in the polyols is about 1 to about 3 equivalents per isocyanate group of the polyisocyanate compounds.

According to the production process of the present invention, polyol and polyisocyanate are reacted in the presence of an organic blowing agent and a catalyst to produce a synthetic resin foam. Tertiary amines, organometallic compounds, etc., and mixtures thereof can be used as such catalysts. Catalysts are usually used in a proportion of about 0.01 to about 10 parts by weight and preferably about 0.1 to about 5 parts by weight per 100 parts by weight of polyol.

Examples of tertiary amines usable as catalysts are monoamines such as triethylamine and dimethylcyclohexylamine; diamines such as tetramethylethylenediamine and, tetramethylhexamethylenediamine; cyclic amines such as triethylenediamine and 1,2-dimethylimidazole; alcoholamines such as dimethylaminoethanol; etc. Examples of organometallic compounds are stannous octoate, dibutyltin dilaurate, dibutyltin diacetate, octenic acid, etc.

In the production process of the present invention, additives known in this technical field can be used (e.g., foam stabilizers, flame retardants, etc.). Examples of foam stabilizers include silicone surfactants, fluorine-containing surfactants, etc. Specific examples are polysiloxane-polyalkylene block copolymer and methylpolysiloxane-based surfactants. Although the proportion of the foam stabilizers can be suitably selected depending on the type of foam stabilizers, it is usually used in a proportion of about 0.1 to about 10 parts by weight per 100 parts by weight of polyol. Phosphoric acid esters (halogenated alkyl, alkyl or aryl esters and the like) can be used as flame retardants. Specific examples are tributoxyethyl phosphate, triethyl phosphate, tributyl phosphate, tris(2-chloroethyl)phosphate, tris(β-chloropropyl)phosphate, etc. Although the proportion of flame retardant can be suitably selected according to the type of flame retardants, it is usually about 5 to about 25 parts by weight based on 100 parts by weight of polyol.

Production conditions can be selected as in conventional production processes. For example, any devices can be used insofar as the starting materials can be uniformly blended. In particular, using mixers, foaming machines, etc., the desired foams can be produced by thoroughly blending and shaping the polyols, polyisocyanate compounds, blowing agents, catalysts and other additives. Blowing agents and other ingredients are usually dissolved in the polyol components in advance and used as premixes so that uniform foams can be more easily prepared. However, the present invention is not limited to such processes, and blowing agents and other ingredients can be dissolved in the polyisocyanate compounds in advance.

The present invention provides a blowing agent that, when mixed with a polyol to form a premix, renders the premix substantially nonflammable despite containing HFC-365mfc.

Synthetic resin foams having excellent thermal insulation and mechanical strength can be obtained by reacting the starting materials in the presence of the blowing agent of the invention.

A blowing agent that has substantially no potential for ozone layer depletion can be provided using a saturated or unsaturated hydrofluoroether (HFE), hydrofluorocarbon (HFC), perfluorocarbon (PFC), fluoroiodocarbon (FIC) or the like as a halogen-containing compound.

The addition of a glycol compound and/or an amide compound to the blowing agent enhances the compatibility of HFC-365mfc and halogen-containing compound with the polyol, thereby providing effects such that evaporation from the premix is discouraged, nonflammability is more easily sustained, the adhesion of the blowing agent is increased, cell uniformity is obtained, etc.

BEST MODE FOR CARRYING OUT THE INVENTION

Examples and comparative examples are given below to illustrate the invention in more detail, but the scope of the invention is not limited to these examples.

The polyols and blowing agents used in the Examples below are as follows:
Polyol A: Polyester polyol having a hydroxyl value of 300.
Polyol B: Polyether polyol having a hydroxyl value of 440.
Halogen-Containing Compound A: pentafluoroethane ($CF_3CF_2H$).
Halogen-Containing Compound B: iodotrifluoromethyl ($CF_3I$).
Halogen-Containing Compound C: octafluorocyclobutane (c-$C_4F_8$).
Halogen-Containing Compound D: 1,2,2,2-tetrafluoroethyl trifluoromethyl ether ($CF_3CFHOCF_3$)

EXAMPLE 1

Flammability of Premix

HFC-365mfc and Halogen-Containing Compounds A, B, C or D described above were mixed at weight ratios of 95:5, 87:13, 75:25 or 80:20, respectively, to give organic blowing agents. The blowing agents thus prepared were mixed with Polyol A, thereby giving premixes. The amounts of the blowing agents were such that HFC-365mfc was contained in an amount of 30 parts by weight per 100 parts by weight of polyol.

In addition, a premix containing HFC-365mfc (30 g) as the only blowing agent was prepared. In particular, a premix was prepared by mixing HFC-365mfc (30 g) and Polyol A (100 g).

Each premix was introduced into a beaker. At 20° C., the flame of a match was brought closer to the surface of the premix vertically from a distance of 50 cm from the surface. With respect to the premix containing HFC-365mfc as the only blowing agent, when the flame of a match came to a distance of 20 cm from the surface of the premix, the flame spread in horizontal directions. In contrast, no spreading of the flame was observed with respect to the other premixes.

EXAMPLES 2 AND 3

Foam Properties

One hundred parts by weight of Polyol B, 1.5 parts by weight of a silicone foam stabilizer, 1 part by weight of water, N,N,N',N'-tetramethylhexane-1,6-diamine in such an amount as necessary to attain a rise time of 70 seconds as a catalyst (together called a "system solution" hereafter), and a blowing agent as shown in Table 1 were blended by vigorous stirring. The stirred mixture thus prepared and 112 parts by weight of crude polymethylene polyphenyl isocyanate (MR-100, manufactured by Nippon Polyurethane Industry Co., Ltd.) were blended by vigorous stirring to foam, giving rigid polyurethane foams. The blowing agent was used in an amount such that the foam acquired a core density of 25±1 kg/m³.

Regarding the foams thus obtained, the physical properties were measured 1 day after foaming, and after 1 week of aging conducted at room temperature (20 to 25° C.). Results of the measurement are shown in Table 1. The foams were evaluated according to JIS A 9514. The blowing agent used in Example 2 had an HFC-365mfc/Halogen-Containing Compound A ratio of 95/5 by weight. The blowing agent used in Example 3 had an HFC-365mfc/Halogen-Containing Compound B ratio of 87/13 by weight.

TABLE 1

|  | Comp. Ex. 1 | Ex. 2 | Ex. 3 |
|---|---|---|---|
| Blowing agent | HFC-365mfc | HFC-365mfc and Halogen-Containing Compound A | HFC-365mfc and Halogen-Containing Compound B |
| Amount of blowing agent | 35 | 35 | 40 |
| 1 day after foaming Density (kg/m$^3$) | 25.0 | 24.5 | 25.3 |
| Thermal conductivity (mW/mK) | 22.5 | 23.2 | 23.7 |
| Compressive strength (kg/m$^2$) | 1.90 | 1.89 | 1.93 |
| After 1 week at room temperature Dimensional change (%) | −2.4 | −3.2 | −4.3 |
| Thermal conductivity change (%) | +9.8 | +9.2 | +10.6 |
| Strength change (%) | +8.2 | +7.4 | +8.8 |

The amount of blowing agent in Table 1 is expressed in parts by weight per 100 parts by weight of polyol.

As is clear from the results shown in Table 1, foams that have a thermal conductivity and compressive strength nearly identical to those of the foam of Comparative Example 1 were obtained. With respect to dimensional change, thermal conductivity change and strength change, foams that are nearly identical to the foam of Comparative Example 1 were prepared. Polyurethane foams having excellent properties can be obtained using the nonflammable blowing agent mixtures of the present invention.

EXAMPLE 4

A blowing agent mixture composed of HFC-365mfc and HFC227ea (CF$_3$CFHCF$_3$) was added in a proportion of 44 parts to 100 parts of the system solution as used in Examples 2 and 3 to give Sample A (HFC-365mfc/HFC227ea ratio of 6.7/1 by weight). A blowing agent mixture composed of HFC-365mfc and HFC227ea was added in a proportion of 54 parts and a glycol compound (diethylene glycol ethyl ether acetate) in a proportion of 23 parts were added to 100 parts of the system solution as used in Example 2 to give Sample B (HFC-365mfc/HFC227ea ratio of 6.7 by weight). With respect to Sample B, the weight of glycol compound was included in the weight of system solution. Therefore, the proportion of blowing agent mixture in Sample B was arranged to be identical to the proportion of blowing agent mixture in Sample A (blowing agent mixture/system solution). In other words, the ratio of blowing agent to polyol was identical in Samples A and B. One hundred grams of each sample was introduced into a 150 ml beaker, and the temperature was increased to 35° C. to determine the amount of the HFC-365mfc/HFC227ea blowing agent mixture evaporated. Table 2 shows the results.

TABLE 2

|  | 30 min | 60 min | 120 min |
|---|---|---|---|
| Sample A | 80.4% | 82.7% | 84.4% |
| Sample B | 65.7% | 71.1% | 75.2% |

With respect to Sample A containing no glycol compound, the proportion of blowing agent mixture evaporated had already exceeded 80% after 30 minutes, and the solution had reached saturation at or around that temperature. In contrast, with respect to Sample B containing a glycol compound, the amount evaporated is clearly less than of Sample A. These results establish that the addition of a glycol compound has the effect of significantly reducing the evaporation of the blowing agent.

The invention claimed is:

1. A process for producing a synthetic resin foam comprising the step of reacting at least one polyol with at least one polyisocyanate compound in the presence of an organic blowing agent and a catalyst,
   the blowing agent being a mixture comprising 1,1,1,3,3-pentafluorobutane (HFC-365mfc) and at least one halogen-containing compound,
   wherein the organic blowing agent and the polyol mixture forms a premix which is substantially nonflammable;
   wherein the at least one halogen-containing compound is nonflammable and has a relatively low thermal conductivity and a boiling point of about −90 to about 60° C.,
   the thermal conductivity of the halogen-containing compounds in the gaseous state is about 8 to about 30 mW/mK at about 1 atmospheric pressure, and
   the halogen-containing compound is at least one member selected from the group consisting of 1,2,2-trifluoroethylene trifluoromethyl ether (CF$_2$=CFOCF$_3$), 1,2,2-trifluoroethylene 1,1,2,2,3,3,3-heptafluoropropyl ether (CF$_2$=CFOCF$_2$CF$_2$CF$_3$), perfluoropropyl epoxide (CF$_3$CF(O)CF$_2$), perfluoro-1-butene (CF$_2$=CFCF$_2$CF$_3$), perfluorohexenes (C$_6$F$_{12}$), perfluorononenes (C$_9$F$_{18}$), perfluorohexane (C$_6$F$_{14}$), perfluorocyclobutane (c-C$_4$F$_8$), iodotrifluoromethyl (CF$_3$I), 1,1,1,2,3,3-hexafluoropropane (CF$_3$CFHCF$_2$H), 1,1,1,3,3,3-hexafluoropropane (CF$_3$CH$_2$CF$_3$), 1,1,1,2,3,3,3-heptafluoropropane (CF$_3$CFHCF$_3$), pentafluoroethane (CF$_3$CF$_2$H), tetrafluoroethanes (CHF$_2$CHF$_2$, CF$_3$CFH$_2$), trifluoromethane (CF$_3$H), 1,1,2,2,3,3,4,4-octafluorobutane (CF$_2$HCF$_2$CF$_2$CF$_2$H), 1,1,1,2,2,3,4,5,5,5-decafluoropentane (CF$_3$CF$_2$CFHCFHCF$_3$), 2-trifluoromethyl-1,1,1,2,3,4,5,5,5-nonafluoropentane (C$_6$F$_{12}$H$_2$), 3,3,4,4,5,5,6,6,6-nonafluoro-1-hexene (F(CF$_2$)$_4$CH=CH$_2$), 2,3,3,4,4,5,5-heptafluoro-1-pentene (CH$_2$CFCF$_2$CF$_2$CF$_2$H), trifluoroethylene (CF$_2$CFH), 1,1,2,2-tetrafluoroethyl difluoromethyl ether (CF$_2$HCF$_2$OCHF$_2$), 1,1,2,2-tetrafluoroethyl methyl ether (CF$_2$HCF$_2$OCH$_3$), 2,2,2-trifluoroethyl 1,1,2,2-tetrafluoroethyl ether (CF$_3$CH$_2$OCF$_2$CF$_2$H), 1,1,2,3,3,3-hexafluoropropyl methyl ether (CF$_3$CFHCF$_2$OCH$_3$), nonafluorobutyl methyl ether (C$_4$F$_9$OCH$_3$), 1-trifluoromethyl-1,2,2,2-tetrafluoroethyl methyl ether ((CF$_3$)$_2$CFOCH$_3$), perfluoropropyl methyl ether (CF$_3$CF$_2$CF$_2$OCH$_3$), 2,2,3,3,3-pentafluoropropyl difluoromethyl ether (CF$_3$CF$_2$CH$_2$OCHF$_2$), 1,2,3,3,4,4-hexafluorocyclobutane (c-C$_4$F$_6$H$_2$), 1-chloro-1,1,2,2,3,3,4,4-octafluorobutane ($CF_2ClCF_2CF_2CF_2H$, boiling point: 50° C.), 1,2-dichlorohexafluorocyclobutane (—$CFClCFClCF_2CF_2$—, boiling point: 60° C.), and 1,1,1,3,3,3-hexafluoropropan-2-ol ($CF_3CH(OH)CF_3$, boiling point: 59° C.);

wherein the organic blowing agent further comprises at least one member selected from the group consisting of ethylene glycol compounds and amide compounds; and wherein the ethylene glycol compound is at least one member selected from the group consisting of those of the following Formulae (I), (II) and (III):

$$C_aH_{2a+1}(OCH_2CH_2O)_bC_cH_{2c+1} \quad (I)$$

wherein a represents 1, 2, 3 or 4; b represents 1, 2 or 3; and c represents 1, 2, 3 or 4;

$$C_dH_{2d+1}CO(OCH_2CH_2O)_eCOC_fH_{2f+1} \quad (II)$$

wherein d represents 0, 1, 2, 3 or 4; e represents 1, 2 or 3; and f represents 0, 1, 2, 3 or 4; and $$C_iH_{2i+1}CO(OCH_2CH_2O)_jC_kH_{2k+1} \quad (III)$$

wherein i represents 0, 1, 2, 3 or 4; j represents 1, 2 or 3; and k represents 1, 2, 3 or 4, and the amide compound is at least one member selected from the group consisting of those of the following Formulae (A) and (B):

$$R^1CONR^2R^3 \quad (A)$$

wherein $R^1$ is a hydrogen atom, a lower alkyl group or a phenyl group; and $R^2$ and $R^3$ are the same or different, and independently represent a hydrogen atom or a lower alkyl group; with the proviso that $R^1$ and $R^2$ may form a heterocyclic ring in conjunction with the carbon atom of the carbonyl group to which $R^1$ is bound and the nitrogen atom to which $R^2$ is bound; and $$R^4R^5NCONR^6R^7 \quad (B)$$

wherein $R^4$, $R^5$, $R^6$ and $R^7$ are the same or different, and represent a hydrogen atom or a lower alkyl group, with the proviso that $R^4$ and $R^6$ may form a heterocyclic ring in conjunction with the nitrogen atom to which $R^6$ is bound, the nitrogen atom to which $R^4$ is bound and the carbon atom of the carbonyl group.

2. The process according to claim 1, wherein the halogen-containing compound has a boiling point lower than the boiling point of HFC-365mfc (400° C.).

3. The process according to claim 1, wherein the halogen-containing compound is nonflammable and has a boiling point of about 10 to about 60° C. and a thermal conductivity when it is in the gaseous state of about 8 to about 20 mW/mK at about 1 atmospheric pressure, and the halogen-containing compound is at least one member selected from the group consisting of perfluorohexane ($C_6F_{14}$) 1,1,2,2-tetrafluoroethyl difluoromethyl ether ($CF_2HCF_2OCHF_2$) 1,1,2,2-tetrafluoroethyl methyl ether ($CF_2HCF_2OCH_3$) and 2,2,2-trifluoroethyl-1,1,2,2-tetrafluoroethyl ether ($CF_3CH_2OCF_2CF_2H$).

4. The process according to claim 1, wherein the halogen-containing compound is 1,1,1,2,3,3,3-heptafluoropropane (HFC227ea: $CF_3CFHCF_3$).

5. The process according to claim 1, wherein the proportion of halogen-containing compound is about 1 to about 49 mol per 100 mol of HFC-365mfc and halogen-containing compound in total.

6. The process according to claim 1, wherein the catalyst is a tertiary amine, an organometallic compound, or a mixture thereof.

7. An organic blowing agent for producing a synthetic resin foam, the organic blowing agent comprising 1,1,1,3,3-pentafluorobutane and at least one halogen-containing compound, wherein the organic blowing agent and a polyol mixture forms a premix which is substantially nonflammable;

wherein the at least one halogen-containing compound is nonflammable and has a relatively low thermal conductivity and a boiling point of about −90 to about 60° C., the thermal conductivity of the halogen-containing compounds in the gaseous state is about 8 to about 30 mW/mK at about 1 atmospheric pressure, and the halogen-containing compound is at least one member selected from the group consisting of 1,2,2-trifluoroethylene trifluoromethyl ether ($CF_2$=$CFOCF_3$), 1,2,2-trifluoroethylene 1,1,2,2,3,3,3-heptafluoropropyl ether ($CF_2$=$CFOCF_2CF_2CF_3$), perfluoropropyl epoxide ($CF_3CF(O)CF_2$), perfluoro-1-butene ($CF_2$=$CFCF_2CF_3$), perfluorohexenes ($C_6F_{12}$), perfluorononenes ($C_9F_{18}$), perfluorohexane ($C_6F_{14}$), perfluorocyclobutane (c-$C_4F_8$), iodotrifluoromethyl ($CF_3I$), 1,1,1,2,3,3-hexafluoropropane ($CF_3CFHCF_2H$), 1,1,1,3,3,3-hexafluoropropane ($CF_3CH_2CF_3$), 1,1,1,2,3,3,3-heptafluoropropane ($CF_3CFHCF_3$), pentafluoroethane ($CF_3CF_2H$), tetrafluoroethanes ($CHF_2CHF_2$, $CF_3CFH_2$), trifluoromethane ($CF_3H$), 1,1,2,2,3,3,4,4-octafluorobutane ($CF_2HCF_2CF_2CF_2H$), 1,1,1,2,2,3,4,5,5,5-decafluoropentane ($CF_3CF_2CFHCFHCF_3$), 2-trifluoromethyl-1,1,1,2,3,4,5,5,5-nonafluoropentane ($C_6F_{12}H_2$), 3,3,4,4,5,5,6,6,6-nonafluoro-1-hexene ($F(CF_2)_4CH$=$CH_2$), 2,3,3,4,4,5,5-heptafluoro-1-pentene ($CH_2CFCF_2CF_2CF_2H$), trifluoroethylene ($CF_2CFH$), 1,1,2,2-tetrafluoroethyl difluoromethyl ether ($CF_2HCF_2OCHF_2$), 1,1,2,2-tetrafluoroethyl methyl ether ($CF_2HCF_2OCH_3$), 2,2,2-trifluoroethyl 1,1,2,2-tetrafluoroethyl ether ($CF_3CH_2OCF_2CF_2H$), 1,1,2,3,3,3-hexafluoropropyl methyl ether ($CF_3CFHCF_2OCH_3$), nonafluorobutyl methyl ether ($C_4F_9OCH_3$), 1-trifluoromethyl-1,2,2,2-tetrafluoroethyl methyl ether (($CF_3$)$_2$CFOCH$_3$), perfluoropropyl methyl ether ($CF_3CF_2CF_2OCH_3$), 2,2,3,3,3-pentafluoropropyl difluoromethyl ether ($CF_3CF_2CH_2OCHF_2$), 1,2,3,3,4,4-hexafluorocyclobutane (c-$C_4F_6H_2$), 1-chioro-1,1,2,2,3,3,4,4-octafluorobutane ($CF_2ClCF_2CF_2CF_2H$, boiling point: 50° C.), 1,2-dichlorohexafluorocyclobutane (—$CFClCFClCF_2CF_2$—, boiling point: 60° C.), and 1,1,1,3,3,3-hexafluoropropan-2-ol ($CF_3CH(OH)CF_3$, boiling point: 59° C.);

wherein the organic blowing agent further comprises at least one member selected from the group consisting of ethylene glycol compounds and amide compounds; and wherein the ethylene glycol compound is at least one member selected from the group consisting of those of the following Formulae (I), (II) and (III);

$$C_aH_{2a+1}(OCH_2CH_2O)_bC_cH_{2c+1} \quad (I)$$

wherein a represents 1, 2, 3 or 4; b represents 1, 2 or 3; and c represents 1, 2, 3 or 4;

$$C_dH_{2d+1}CO(OCH_2CH_2O)_eCOC_fH_{2f+1} \quad (II)$$

wherein d represents 0, 1, 2, 3 or 4; e represents 1, 2 or 3; and f represents 0, 1, 2, 3 or 4; and $$C_iH_{2i+1}CO(OCH_2CH_2O)_jC_kH_{2k+1} \quad (III)$$

wherein i represents 0, 1,2, 3 or 4;j represents 1,2 or 3; and k represents 1,2, 3 or 4, and the amide compound is at least one member selected from the group consisting of those of the following Formulae (A) and (B):

$$R^1CONR^2R^3 \quad (A)$$

wherein $R^1$ is a hydrogen atom, a lower alkyl group or a phenyl group; and $R^2$ and $R^3$ are the same or different, and independently represent a hydrogen atom or a lower alkyl group; with the proviso that $R^1$ and $R^2$ may form a heterocyclic ring in conjunction with the carbon atom of the carbonyl group to which $R^1$ is bound and the nitrogen atom to which $R^2$ is bound; and $$R^4R^5NCONR^6R^7 \quad (B)$$

wherein $R^4$, $R^5$, $R^6$ and $R^7$ are the same or different, and represent a hydrogen atom or a lower alkyl group, with the proviso that $R^4$ and $R^6$ may form a heterocyclic ring in conjunction with the nitrogen atom to which $R^6$ is bound, the nitrogen atom to which $R^4$ is bound and the carbon atom of the carbonyl group.

8. The blowing agent according to claim 7, wherein the halogen-containing compound is 1,1,1,2,3,3,3-heptafluoropropane (HFC$_{227}$ea: CF$_3$CFHCF$_3$).

9. A premix for producing a synthetic resin foam, the premix comprising an organic blowing agent and at least one polyol,
the blowing agent being a mixture comprising 1,1,1,3,3-pentafluorobutane and at least one halogen-containing compound,
wherein the premix is substantially nonflammable;
wherein the at least one halogen-containing compound is nonflammable and has a relatively low thermal conductivity and a boiling point of about −90 to about 60° C.,
the thermal conductivity of the halogen-containing compounds in the gaseous state is about 8 to about 30 mW/mK at about 1 atmospheric pressure, and
the halogen-containing compound is at least one member selected from the group consisting of 1,2,2-trifluoroethylene trifluoromethyl ether (CF$_2$=CFOCF$_3$), 1,2,2-trifluoroethylene 1,1,2,2,3,3,3-heptafluoropropyl ether (CF$_2$=CFOCF$_2$CF$_3$), perfluoropropyl epoxide (CF$_3$CF(O)CF$_2$), perfluoro-1-butene (CF$_2$=CFCF$_2$CF$_3$), perfluorohexenes (C$_6$F$_{12}$), perfluorononenes (C$_9$F$_{18}$), perfluorohexane (C$_6$F$_{14}$), perfluorocyclobutane (c-C$_4$F$_8$), iodotrifluoromethyl (CF$_3$I), 1,1,1,2,3,3-hexafluoropropane (CF$_3$CFHCF$_2$H), 1,1,1,3,3,3-hexafluoropropane (CF$_3$CH$_2$CF$_3$), 1,1,1,2,3,3,3-heptafluoropropane (CF$_3$CFHCF$_3$), pentafluoroethane (CF$_3$CF$_2$H), tetrafluoroethanes (CHF$_2$CHF$_2$, CF$_3$CFH$_2$), trifluoromethane (CF$_3$H), 1,1,2,2,3,3,4,4-octafluorobutane (CF$_2$HCF$_2$CF$_2$CF$_2$H), 1,1,1,2,2,3,4,5,5,5-decafluoropentane (CF$_3$CF$_2$CFHCFHCF$_3$), 2-trifluoromethyl-1,1,1,2,3,4,5,5,5-nonafluoropentane (C$_6$F$_{12}$H$_2$), 3,3,4,4,5,5,6,6,6-nonafluoro-1-hexene (F(CF$_2$)$_4$CH=CH$_2$), 2,3,3,4,4,5,5-heptafluoro-1-pentene (CH$_2$CFCF$_2$CF$_2$CF$_2$H), trifluoroethylene (CF$_2$CFH), 1,1,2,2-tetrafluoroethyl difluoromethyl ether (CF$_2$HCF$_2$OCHF$_2$), 1,1,2,2-tetrafluoroethyl methyl ether (CF$_2$HCF$_2$OCH$_3$), 2,2,2-trifluoroethyl 1,1,2,2-tetrafluoroethyl ether (CF$_3$CH$_2$OCF$_2$CF$_2$H), 1,1,2,3,3,3-hexafluoropropyl methyl ether (CF$_3$CFHCF$_2$OCH$_3$), nonafluorobutyl methyl ether (C$_4$F$_9$OCH$_3$), 1-trifluoromethyl-1,2,2,2-tetrafluoroethyl methyl ether ((CF$_3$)$_2$CFOCH$_3$), perfluoropropyl methyl ether (CF$_3$CF$_2$CF$_2$OCH$_3$), 2,2,3,3,3-pentafluoropropyl difluoromethyl ether (CF$_3$CF$_2$CH$_2$OCHF$_2$), 1,2,3,3,4,4-hexafluorocyclobutane (c-C$_4$F$_6$H$_2$), 1-chloro-1,1,2,2,3,3,4,4-octafluorobutane (CF$_2$ClCF$_2$CF$_2$CF$_2$H, boiling point: 50° C.), 1,2-dichlorohexafluorocyclobutane (—CFClCFClCF$_2$CF$_2$—, boiling point: 60° C.), and 1,1,1,3,3,3-hexafluoropropan-2-ol (CF$_3$CH(OH)CF$_3$, boiling point: 59° C.);
wherein the organic blowing agent further comprises at least one member selected from the group consisting of ethylene glycol compounds and amide compounds; and
wherein the ethylene glycol compound is at least one member selected from the group consisting of those of the following Formulae (I), (II) and (III):

$$C_aH_{2a+1}(OCH_2CH_2O)_bC_cH_{2c+1} \quad (I)$$

wherein a represents 1, 2, 3 or 4; b represents 1, 2 or 3; and c represents 1, 2, 3 or 4;

$$C_dH_{2d+1}CO(OCH_2CH_2O)_eCOC_fH_{2f+1} \quad (II)$$

wherein d represents 0, 1, 2, 3 or 4; e represents 1, 2 or 3; and f represents 0, 1, 2, 3 or 4; and $$C_iH_{2i+1}CO(OCH_2CH_2O)_jC_kH_{2k+1} \quad (III)$$

wherein i represents 0, 1, 2, 3 or 4; j represents 1, 2 or 3; and k represents 1, 2, 3 or 4, and the amide compound is at least one member selected from the group consisting of those of the following Formulae (A) and (B):

$$R^1CONR^2R^3 \quad (A)$$

wherein $R^1$ is a hydrogen atom, a lower alkyl group or a phenyl group: and $R^2$ and $R^3$ are the same or different, and independently represent a hydrogen atom or a lower alkyl group; with the proviso that $R^1$ and $R^2$ may form a heterocyclic ring in conjunction with the carbon atom of the carbonyl group to which $R^1$ is bound and the nitrogen atom to which $R^2$ is bound; and $$R^4R^5NCONR^6R^7 \quad (B)$$

wherein $R^4$, $R^5$, $R^6$ and $R^7$ are the same or different, and represent a hydrogen atom or a lower alkyl group, with the proviso that $R^4$ and $R^6$ may form a heterocyclic ring in conjunction with the nitrogen atom to which $R^4$ is bound, the nitrogen atom to which $R^4$ is bound and the carbon atom of the carbonyl group.

10. The premix according to claim 9, wherein the halogen-containing compound is 1, 1, 1, 2, 3, 3, 3-heptafluoropropane (HFC$_{227}$ea: CF$_3$CFHCF$_3$).

* * * * *